United States Patent [19]

Spease

[11] Patent Number: 4,872,367
[45] Date of Patent: Oct. 10, 1989

[54] LOST MOTION END FITTING

[75] Inventor: Arthur L. Spease, Bloomfield Hills, Mich.

[73] Assignee: Teleflex Incorporated, Limerick, Pa.

[21] Appl. No.: 208,147

[22] Filed: Jun. 17, 1988

[51] Int. Cl.$^4$ .............................................. F16C 1/10
[52] U.S. Cl. ................... 74/502.6; 74/500.5; 74/502.4
[58] Field of Search ............ 74/501.5 R, 502.4, 502.5, 74/502.6, 500.5; 188/2 D

[56] References Cited

U.S. PATENT DOCUMENTS

| T984,001 | 7/1979 | Kelly | 74/501.5 R |
|---|---|---|---|
| 3,665,784 | 5/1972 | Bennett | 74/502.6 |
| 3,729,070 | 4/1973 | LeMarchand | 188/2 D |
| 4,464,950 | 8/1984 | Deligny | 74/501.5 R |
| 4,658,668 | 4/1987 | Stocker | 74/501.5 R |
| 4,688,445 | 8/1987 | Spease | 74/501.5 R |

FOREIGN PATENT DOCUMENTS 134036  1/1983  Japan ................... 188/2 D

Primary Examiner—Gary L. Smith
Assistant Examiner—F. Saether
Attorney, Agent, or Firm—Reising, Ethington, Barnard, Perry & Milton

[57] ABSTRACT

A motion transmitting remote control assembly (10, 110) of the type for transmitting motion in a curved path. The assembly (10, 110) includes a conduit (14, 114) having an end fitting (16, 118) thereon adapted for mounting to a support structure. A tubular member (22, 122) is connected to and extends from the end fitting (16, 118). A telescoping member (25, 125) is slideably supported by the tubular member (22, 122). A coupling member (30, 130) fixedly supports the telescoping member (25, 125) and defines a channel (34, 134) therein. A core element (26, 126) extends through the conduit (14, 114) and the tubular member (22, 122) and into the channel (34, 134) of the coupling member (30, 130). A slug (46, 146) is disposed on the end of the core element (26, 126) and is received in the channel (34, 134) to define a lost motion connection between the core element (26, 126) and the coupling member (30, 130). The lost motion connection allows relative longitudinal movement between the core element (26, 126) and coupling member (30, 130) along a predetermined overlapping length while simultaneously allowing for relative telescoping movement between the coupling member (30, 130) and the tubular member (22, 122) along the predetermined length.

12 Claims, 2 Drawing Sheets

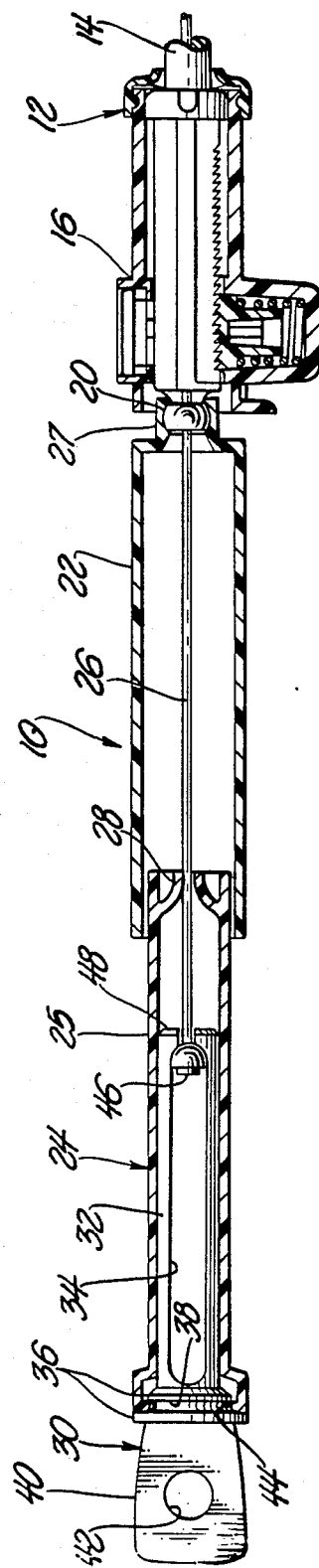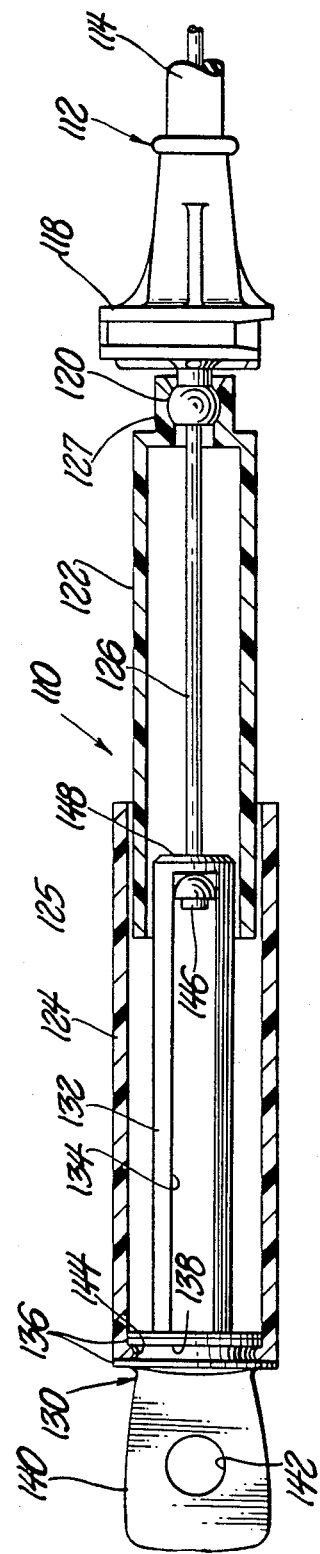

U.S. Patent Oct. 10, 1989 Sheet 2 of 2 4,872,367
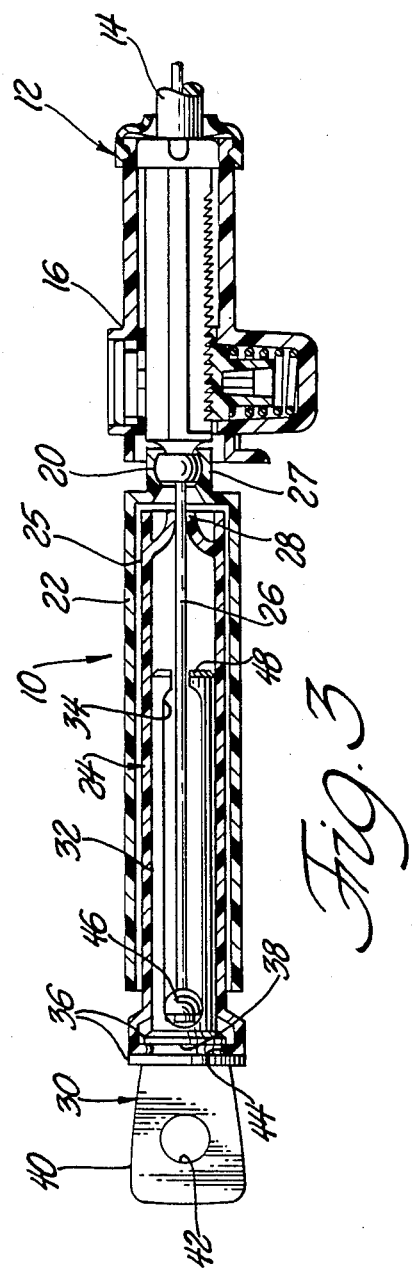
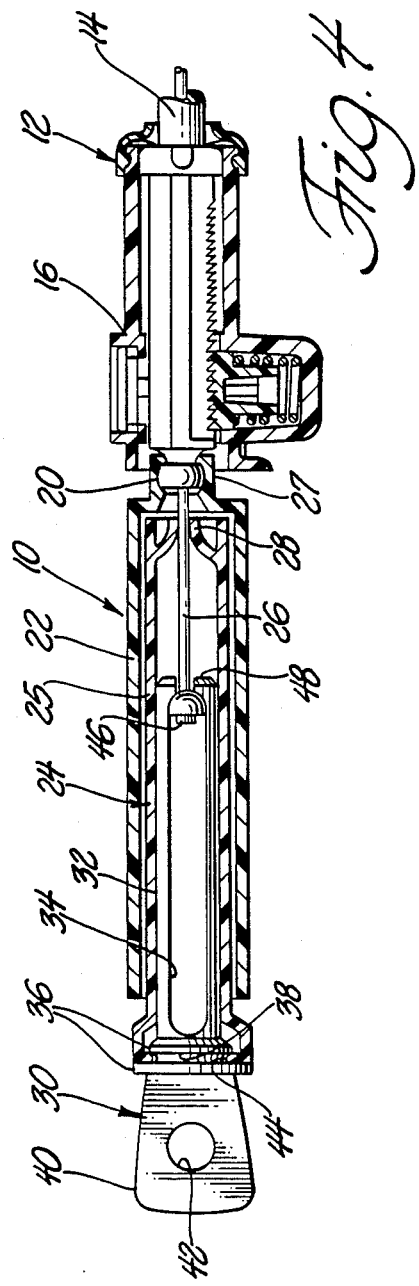

LOST MOTION END FITTING

TECHNICAL FIELD

The instant invention relates to a motion transmitting remote control assembly of the type wherein motion is transmitted in a curved path by a flexible motion transmitting core element movably supported by a flexible conduit.

BACKGROUND ART

Motion transmitting remote control assemblies of the type utilizing a motion transmitting core element have many uses in automotive environments. One such use is in connection with a cruise control. Typically, when not engaged, a cruise control assembly does not affect the operation of the throttle linkage which is independently controlled by the accelerator pedal. When the cruise control assembly is engaged the throttle linkage is set and retained in position thereby.

Because of the design requirements and limited space in the engine compartment of today's automobiles, it is necessary to provide a cruise control assembly having a relatively shorter length from the support member to the throttle linkage or controlled member than previously known assemblies. The assembly must not affect normal movement of the throttle linkage when not engaged. When engaged, the cruise control should set and maintain the position and throttle linkage In one known cruise control assembly, a motion transmitting remote control assembly of the type having a conduit and a movably extending core element is utilized. An end member is movably supported by the conduit. The end member includes a tubular portion. One end of the tubular portion defines a channel therein for receiving a slug which is disposed on the end of the core element and defining a lost motion connection between the core element and end member. The end member further contains a coupling member for connecting the end member to a control member. The conduit further includes a fitting for attaching the assembly to a support structure. The system is deficient in that the entire end member is movable with respect to the conduit. That is, there is no relative longitudinal movement between the lost motion connection and the end member. Thus, there is no overlapping arrangement between the lost motion connection and the end member. This system requires an excessive and undesirable overall length to effectuate proper movement of the core element.

The U.S. Pat. No. 3,572,159 to Tschanz issued Mar. 23, 1969 discloses a similar motion transmitting remote control assembly. In this assembly, a telescoping member is slideably supported by a conduit. An end fitting connects the telescoping member with a member to be controlled. The end fitting includes an elongated opening for providing a lost motion connection between the end member and the member to be controlled. The lost motion connection is at the connection between the end member and the controlled member and therefore requires an overall length which is excessive for some environments.

STATEMENT OF THE INVENTION AND ADVANTAGES

According to the present invention, there is provided a motion transmitting remote control assembly of the type for transmitting forces along a curved path by a motion transmitting core element. The assembly comprises conduit means, and a tubular member extending from the conduit means. Telescoping means is slideably supported by the tubular member for relative telescoping movement between the telescoping means and the tubular member along a predetermined overlapping length therebetween. A movable core element is slideably disposed in the conduit means and extends through the tubular member and into the telescoping means. The assembly is characterized by lost motion connection means disposed within the telescoping means for connecting the core element with the telescoping means for allowing relative longitudinal movement between the core element and the telescoping means along the predetermined overlapping length while simultaneously allowing for relative telescoping movement between the telescoping means and the tubular member along the same or close to the predetermined length.

Accordingly, there is provided an assembly which includes a lost motion connection for allowing relative longitudinal movement between a telescoping means and a tubular member while simultaneously allowing for relative longitudinal movement between the core element and telescoping means over a minimal predetermined overlapping area to provide an assembly which effectuates the same movement of a member to be controlled as in the prior art while providing an assembly having a substantially shorter overall length.

FIGURES IN THE DRAWINGS

Other advantages of the present invention will be readily appreciated as the same becomes better understood by reference to the following detailed description when considered in connection with the accompanying drawings wherein:

FIG. 1 is a cross-sectional view of one preferred embodiment of the present invention;

FIG. 2 is a cross-sectional view of an alternative embodiment;

FIG. 3 is a cross-sectional view of the preferred embodiment when the cruise assembly is inoperative.

FIG. 4 is a cross-sectional view of the preferred embodiment when the cruise assembly is operative.

DETAILED DESCRIPTION OF THE DRAWINGS

A motion transmitting remote control assembly of the type for transmitting forces along a curved path by a motion transmitting core element is generally shown at 10 and 110 in the Figures.

The assembly 10 includes conduit means or assembly generally indicated at 12. The conduit assembly 12 includes a flexible conduit 14. The conduit 14 is preferably of the type including an inner tubular member made of an organic polymeric material and surrounded by a plurality of long lay wires disposed helically thereabout with a casing of organic polymeric material disposed about the long lay wires and the inner tubular member. Further, the conduit 14 may include a fitting (not shown) for securing the conduit 14 with a support structure (at the opposite end). The conduit assembly 12 further may include conduit connection means 16. The conduit connection means may comprise a conduit length adjustment means 16 for adjusting the overall length of the conduit 14 and adapted for connection to a support structure, not shown but well known in the art. The conduit connection length adjustment means 16 may include swivel means in the form of a ball socket 20 thereon. This socket may not be needed when arcuate movement is not required.

A tubular member 22 extends from the conduit assembly 12. More particularly, the tubular member 22 includes a cylindrical wall 27 parallel to and spaced from the wall of the tubular portion 22. The cylindrical wall 27 is adapted for attachment to the ball socket 20 of the conduit assembly 12. Thus, the conduit connection means 16 includes a ball socket 20 connecting the tubular member 22 to the conduit connection means 16 for swiveling movement relative thereto. That is, the tubular member 22 is pivotally connected to the conduit connection means 16.

The assembly 10 further includes telescoping means 24 which is slideably supported by the tubular member 22 for relative telescoping movement between the telescoping means 24 and the tubular member 22 along a predetermined overlapping length therebetween. In the FIG. 1 embodiment, the entire telescoping means 24 is telescopically disposed within the tubular member 22. This embodiment is arranged in the automobile engine compartment in such a manner that the conduit assembly 12 is raised slightly higher than the telescoping means 24. In other words, the embodiment is on an incline, such that the conduit assembly 12 is higher relative to the telescoping means 24. This permits to water run off from the tubular member 22 to drain off the assembly 10 without entering the tubular member 22. The telescoping means 24 is disposed within the tubular member 22 so as to define an overlapping length. This overlapping length is the length in which the telescoping means 24 can be moved within the tubular member 22.

The telescoping means 24 includes a tubular telescoping member 25 and a coupling member generally indicated at 30. The coupling member 30 supports the tubular telescoping member 25. More specifically, the coupling member 30 includes a shaft 32 having first and second ends. The coupling member 30 further includes a connector member which is preferably integral with the shaft 32. The connector member includes a pair of radially extending flanges 36 at the first end of the shaft 32. The flanges 36 define a groove 38 therebetween. The second end of the shaft is closed by a radially extending wall 48 having a hole therethrough. The telescoping member 25 includes a radially extending lip 44. The lip 44 is disposed in the groove 38 of the coupling member 30 to fixedly secure the tubular telescoping member 25 to the coupling member 30. When the lip 44 is disposed in the groove 38 thereby connecting the coupling member 30 with the telescoping member 25, the shaft 32 extends longitudinally within and is radially spaced from the telescoping member 25. Further, the shaft 32 extends into and is telescopically disposed within the tubular member 22.

The coupling member 30 further includes a connecting portion 40 having a hole 42 therethrough. The hole 42 is for connecting the coupling member 30 with a control or controlled member or member to be controlled (not shown). When the coupling member 30 and telescoping member 25 are fixedly connected, the connecting portion 40 extends in the longitudinal direction away from the telescoping member 25 and shaft 32.

The connection between the coupling member 30 and the control member is a non-lost motion connection. That is, the hole 42 is of such a diameter as to fit the control member to prevent relative longitudinal movement between the control member and the coupling member 30.

The assembly 10 further includes a movable core element 26 slideably disposed in the conduit assembly 12 and extending through the tubular member 22 and into the shaft 32 of the coupling member 30. The core element 26 passes into the shaft 32 by passing through an opening in the wall 48 of the shaft 32. When the entire telescoping means 24 is disposed within the tubular member 22 (as in FIG. 1), the telescoping member 25 includes a radially extending lip 28 at the inward end thereof for guiding the core element 26.

The assembly 10 is characterized by including lost motion connection means disposed within the member 25 of telescoping means 24 and specifically within the coupling member 30. The lost motion connection means connects the core element 26 with the telescoping means 24 for allowing relative longitudinal movement between the core element 26 and the telescoping means 24 along the predetermined overlapping length while simultaneously allowing for relative telescoping movement between the telescoping means 24 and the tubular member 22 along the predetermined overlapping length.

The lost motion connection means comprises a channel 34 defined by the shaft 32 and a slug 46 fixedly secured to the end of the core element 26. The slug 46 is slideably retained by the channel 34 for movement of the slug 46 along the channel 34 to effect a lost motion connection between the core element 26 and the shaft 32 of the coupling member 30. In other words, the slug 46 is not fixedly secured to the channel 34, but is slideably retained therein. This allows relative longitudinal movement between the core element 26 and shaft 32.

It is important that the lost motion connection, the slug 46 disposed in the channel 34 defined by the shaft 32, is located within the coupling member 30. This permits an overlapping arrangement between the coupling member 30 and the tubular member 22 and allows the lost motion connection to be placed within this overlapping length. This arrangement provides for a minimal length required between the conduit assembly 12 and the connecting portion 40.

In operation, the assembly is initially in the position as shown in FIG. 1 (with the slight height variation as previously set forth). That is, the telescoping member 25 extends completely from the tubular member 22 and the ball slug 46 is disposed against the back wall 48 of the channel 34. When the cruise control is not engaged, the controlled member (not shown) is independently actuated by an accelerator pedal and cable assembly When the controlled member is actuated by the acceleration assembly, the coupling member 30 and telescoping member 25 are forced to the right as viewed in FIG. 1 by the movement of the controlled member. The telescoping member 25 and the coupling member 30 are then telescopically moved within the tubular member 22 and moved relative to slug 46 (as best viewed in FIG. 3). The slug 46 does not hinder movement of the connector member 30 or the telescoping member 25 into the tubular member 22 since the slug 46 is slideably supported by the channel 34. The slug 46 and core element 26 are thus moveable relative to the coupling member 30 and the telescoping member 25. This lost motion connection thereby permits normal operation of the accelerator when the cruise assembly 10 is not in operation.

When the cruise control assembly 10 is operative, the position of the control member is set by the assembly 10. Specifically, the movement of the coupling member 30 and the telescoping member 25 is controlled by the core element 26. When the cruise control is engaged, the core element 26 is moved to the right as seen in FIG. 1. This causes the slug 46 to remain engaged to the back wall 48 of the channel 34 and move the coupling member 30 and the telescoping member 25 to the right as viewed in FIG. 4. This movement is, in turn, transmitted to the connecting portion 40 and thereby actuates the controlled member, in a cruise control environment, a throttle linkage.

A second embodiment of the present invention is shown in FIG. 2. In the description of the second embodiment which follows, like parts to those of the first embodiment are depicted by the same reference numerals offset by 100. There is provided an alternate cruise control assembly 110. The assembly 110 includes a conduit means or assembly 112. The conduit assembly 112 includes a flexible conduit 114. Also, the conduit assembly 112 may include a fitting 118 adapted to be supported in a support structure (not shown). The fitting 118 may have a ball socket 120 thereon. This ball socket 120 may not be necessary when arcuate movement is not required.

A tubular member 122 extends from the conduit assembly 112. More particularly, the tubular member 122 includes a cylindrical wall 127 parallel to and spaced from the wall of the tubular portion adapted for attachment to the ball socket 120. This allows the tubular member 122 to be rotatably and pivotally connected to the fitting 118.

The assembly 110 further includes telescoping means 124 slideably supported by the tubular member 122. The telescoping means 124 comprises a telescoping member 125 and a coupling member 130. The coupling member 130 supports the telescoping member 125. Specifically, the coupling member 130 includes a shaft 132 having first and second ends. The coupling member further includes a pair of radially extending flanges 136 at the first end of the shaft 132. The flanges 136 define a groove 138 therebetween. The telescoping member 125 includes a radially extending lip 144 for disposition in the groove 138 to provide a fixed connection between the coupling member 130 and the telescoping member 125. When the lip 144 is disposed in the groove 138 thereby fixedly connecting the telescoping member 125 to the coupling member 130, the shaft 132 extends longitudinally within and is radially spaced from the telescoping member 125. Further, the shaft 132 is telescopically disposed within the tubular member 122.

The coupling member 130 further includes a connecting portion 140 having a hole 142 therethrough. The hole 142 is for connecting the coupling member 130 with a control member or member to be controlled (not shown). The connecting portion 140 extends longitudinally away from the shaft 132.

The assembly 110 further includes a flexible core element 126 slideably supported by the conduit assembly 112. The core element 126 extends through the tubular member 122 and into the shaft 132 of the coupling member 130. Specifically, the core element 126 has a slug 146 fixedly secured on the end thereof. The slug 146 is slideably retained by the channel 134 defined by the shaft 132. This effectuates a lost motion connection between the core element 126 and the coupling member 130, by allowing relative longitudinal movement between the core element 126 and the shaft 132.

In the alternate embodiment, the shaft 132 of the coupling member 130 is telescopically disposed within the tubular member 122. Further, the telescoping member 125 is telescopically disposed about the exterior of the tubular member 122. In this arrangement, the telescoping member 125 is arranged so as to be slightly higher in orientation with respect to the conduit assembly 112. That is, the assembly 110 is on an incline such that the telescoping member 125 is higher relative to the conduit assembly 112. This permits water to run off the telescoping member 125 without entering either the telescoping member 125 or the tubular member 122.

Operation of this assembly 110 is identical to that discussed above for the first embodiment with the exception that in the alternative assembly 110, the telescoping member 125 moves outside of the tubular member 122.

It should be noted that the operative arrangement of the assembly 10 can be reversed. That is, the telescoping means 24 may initially be fully overlapped with the tubular member 22 to start. In this arrangement, the slug 46 would be initially disposed against the first end of the channel 34 (This starting orientation would be the same as the position shown in FIG. 3). This would permit a "push" operation of the assembly 10. That is, when the cruise is operative, the core element 26 is moved to the left as viewed in FIG. 3 and thereby moves the control member (not shown) which is connected to the hole 42 to move to the left. When the assembly 10 is inoperative in this arrangement, the accelerator assembly independently actuates the control member. Independent movement imparted to the control member moves the telescoping member 25 and connector member 30 to the left as viewed in FIG. 3 and the ball slug 46 slides relative to the channel 34 of the connector member 30 and does not hinder movement of the assembly. (The resulting position would be similar to that of FIG. 1). This permits the control member to be independently actuated by the accelerator assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10,110) of the type for transmitting forces along a curved path by a motion transmitting core element (26,126), said assembly (10,110) comprising: conduit means (12,112); a tubular member (22,122) extending from said conduit means; telescoping means (24,124) comprising a tubular telescoping member (25,125) and a coupling member (25,125) slideably supported by said tubular member (22,122) and extending longitudinally outwardly therefrom in the direction of said coupling member (30,130) for relative telescoping movement between said telescoping means (24,124) and said tubular member (22,122) along predetermined overlapping length therebetween; a moveable core element (26,126) slideably disposed in said conduit means (12,112) and extending through said tubular member (22,122) and into said telescoping means (24,124); said assembly (10,110) characterized by lost motion connection means disposed within said telescoping means (24,124) and connecting said core element (26,126) with said telescoping means (24,124) for allowing relative longitudinal movement between said core element (26,126) and said telescoping means (24,124) along said predetermined overlapping length while simultaneously allowing for telescoping movement of said telescoping means (24,124) into and out of said tubular member (22,122) along said predetermined length.

2. An assembly as set forth in claim 1 further characterized by said coupling member (30,130) fixedly secured to and supporting said telescoping member (25,125), said telescoping member (25,125) being moveable with said coupling member (30,130).

3. An assembly as set forth in claim 2 further characterized by said coupling member (30, 130) comprising a shaft (32, 132) extending between first and second ends and defining a longitudinally extending channel (34, 134) therein; a connector member (40, 140) disposed at said first end of said shaft and extending away from said channel (34, 134) and adapted for attachment to a control member.

4. An assembly as set forth in claim 3 further characterized by said lost motion connection means comprising said channel (34, 134) and a slug (46, 146) fixedly secured to said core element (26, 126), said channel (34, 134 slideably retaining said slug (46 146) for movement of said slug (46, 146) therealong to effect said lost motion.

5. An assembly as set forth in claim 4 further characterized by said telescoping member (25) being telescopically disposed within said tubular member (22).

6. An assembly as set forth in claim 5 further characterized by said telescoping member (25) including a radially extending lip (28) at the inward end thereof for guiding said core element (26) therein.

7. An assembly as set forth in claim 4 further characterized by said telescoping member (125) being telescopically disposed about the exterior of said tubular member (122), said shaft (132) being radially spaced from said telescoping member (125) and telescopically disposed within said tubular member (122).

8. An assembly as set forth in either claim 5 or 7 further characterized by said coupling member (30, 130) including a pair of radially extending flanges (36, 136) defining a groove (38, 138) therebetween, said telescoping member (25 125) including a radially extending lip (44, 144) at one end thereof, said lip (44, 144) disposed in said groove (38, 138) for connecting said coupling member (30, 130) to said telescoping member (25, 125).

9. An assembly as set forth in claim 8 further characterized by said coupling member (30, 130) having a hole (42, 142) therethrough for non-lost motion connection of said coupling member (30, 130) with a control member.

10. An assembly as set forth in claim 9 further characterized by said conduit means (12, 112) including a flexible conduit (14, 114) and having conduit connection means (16, 118) thereon, said connection means (16, 118) including swivel means (20, 120) connecting said tubular member (22, 122) to said conduit connection means (16, 118) for swiveling movement relative thereto.

11. An assembly as set forth in claim 10 further characterized by said conduit connection means (16, 118) comprising a conduit length adjustment means (16) for adjusting the overall length of said conduit means (12) and adapted for connection to a support structure.

12. An assembly as set forth in claim 10 further characterized by said conduit connection means (16, 118) comprising an end fitting (118) adapted to be supported in a support structure.

* * * * *